(12) United States Patent
Moss et al.

(10) Patent No.: US 11,086,043 B2
(45) Date of Patent: Aug. 10, 2021

(54) PASSIVE MAGNETIC RANGING

(71) Applicant: Scientific Drilling International, Inc., Houston, TX (US)

(72) Inventors: Clinton Moss, Edmonton (CA); Douglas Ridgway, Edmonton (CA); Troy Martin, Edmonton (CA)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 85 days.

(21) Appl. No.: 16/526,164

(22) Filed: Jul. 30, 2019

(65) Prior Publication Data

US 2020/0041684 A1  Feb. 6, 2020

Related U.S. Application Data

(60) Provisional application No. 62/713,771, filed on Aug. 2, 2018.

(51) Int. Cl.
*G01V 3/26* (2006.01)
(52) U.S. Cl.
CPC ..................................... *G01V 3/26* (2013.01)
(58) Field of Classification Search
CPC ..... E21B 47/0228; E21B 47/092; E21B 47/13
See application file for complete search history.

(56) References Cited

U.S. PATENT DOCUMENTS

| | | | |
|---|---|---|---|
| 5,442,294 A * | 8/1995 | Rorden | G01V 3/28 324/339 |
| 5,512,830 A | 4/1996 | Kuckes | |
| 2003/0117134 A1* | 6/2003 | Almaguer | G01N 27/82 324/221 |
| 2004/0249573 A1* | 12/2004 | McElhinney | E21B 47/022 702/7 |
| 2011/0298462 A1* | 12/2011 | Clark | E21B 47/024 324/346 |
| 2012/0145463 A1 | 6/2012 | Lee et al. | |
| 2014/0121971 A1 | 5/2014 | Hanak et al. | |

(Continued)

OTHER PUBLICATIONS

International Search Report and Written Opinion issued in Application No. PCT/US2019/044109, dated Oct. 28, 2019, 9 pages.

*Primary Examiner* — Alvaro E Fortich
(74) *Attorney, Agent, or Firm* — Locklar PLLC

(57) ABSTRACT

A method comprises a) positioning a passive magnetic ranging (PMR) tool in a drilling well that is near a target well that includes a ferromagnetic casing, b) measuring with each of the magnetometers a local magnetic anomaly created by the ferromagnetic casing of the target well so as to generate a plurality of magnetometer readings corresponding to the positions of the magnetometers; c) receiving the plurality of magnetometer readings with the controller; and d) using the received measurements to calculate ranging information, the ranging information including the range and direction from the PMR tool to the target well. The PMR tool may include a ranging collar, a longitudinal array of magnetometers extending along the length of the ranging collar, and a controller, the controller operatively connected to the plurality of magnetometers. The PMR tool may further comprise a radial array of magnetometers positioned radially about the ranging collar.

20 Claims, 7 Drawing Sheets

(56) References Cited

U.S. PATENT DOCUMENTS

| | | | |
|---|---|---|---|
| 2015/0378043 A1* | 12/2015 | Brooks | ............... E21B 47/0228 702/9 |
| 2016/0258275 A1 | 9/2016 | Wu et al. | |
| 2016/0273338 A1 | 9/2016 | Wu | |
| 2018/0038225 A1 | 2/2018 | Wilson et al. | |

* cited by examiner

PASSIVE MAGNETIC RANGING

CROSS-REFERENCE TO RELATED APPLICATIONS

This application is a non-provisional application which claims priority from U.S. provisional application No. 62/713,771, filed Aug. 2, 2018, which is incorporated by reference herein in its entirety.

TECHNICAL FIELD/FIELD OF THE DISCLOSURE

The present disclosure relates generally to downhole drilling and specifically to magnetic ranging between downhole tools.

BACKGROUND OF THE DISCLOSURE

When drilling a wellbore, knowledge of surrounding features and other wellbores may be necessary to avoid intersecting the wells or to maintain a desired spacing between adjacent wells. For example, when drilling a relief well or steam-assisted gravity drainage (SAGD) well, the relative distance and direction from the drilling well to the existing cased target well must be determined. Typically, active ranging between the intercept well to the target well is used, wherein a magnetic source is positioned within the target well at a predetermined survey point and activated. A ranging tool in the intercept well is then used to measure the magnetic field of the magnetic source and calculate the distance and direction based on this data. Such an operation requires access to the target well; the magnetic source must be conveyed into the target well by wellbore tractor, wireline, or by coiled tubing; and the magnetic source must remain energized within the target well during the entire drilling operation. Data collection typically involves taking multiple surveys at intervals along the length of the intercept well, transmitting the data to the surface, and analyzing the data on the surface to fit a model to generate ranging distance and direction for each ranging operation.

SUMMARY

In some embodiments, a method comprises a) positioning a passive magnetic ranging (PMR) tool in a drilling well, the drilling well having a desired proximity to a target well, the target well including a ferromagnetic casing, the PMR tool including: a ranging collar, a longitudinal array of magnetometers extending along the length of the ranging collar, and a controller, the controller operatively connected to the plurality of magnetometers; b) measuring with each of the magnetometers a local magnetic anomaly created by the ferromagnetic casing of the target well so as to generate a plurality of magnetometer readings corresponding to the positions of the magnetometers; c) receiving the plurality of magnetometer readings with the controller; and d) using the received measurements to calculate ranging information, the ranging information including the range and direction from the PMR tool to the target well.

The PMR tool may further comprise a radial array of magnetometers positioned radially about the ranging collar, and the ranging information may be calculated at least in part based on measurements of the magnetometers of the radial array of magnetometers. The controller may be further operatively connected to a measurement-while-drilling (MWD) tool, and the method may further comprise determining an azimuth, inclination and toolface orientation of the PMR tool with the MWD tool.

The method may further comprise, before step d), for each magnetometer position, subtracting the Earth magnetic field at that magnetometer position from the magnetometer reading at that position. The Earth magnetic field at each magnetometer position may be based on the azimuth, inclination and toolface orientation of the PMR tool. Step d) may include fitting the received measurements to a model selected to represent the local magnetic anomaly created by the casing and the model may be selected from a magnetic monopole, a smeared monopole, a series of magnetic monopoles, or a magnetic dipole.

The PMR tool may include a telemetry system operatively coupled to the controller, and may further including the steps of: transmitting an instruction from the surface, the instruction specifying at least one of the model to be selected by the processor, a parameter of the selected model, or a constraint of the model fit to be used by the processor when calculating the ranging information; receiving the instruction by the telemetry system; and calculating the ranging information according to the received instruction.

Step a) of the method may comprise moving the PMR tool through the drilling well; sampling the magnitude of the local magnetic anomaly with a magnetometer as the PMR tool moves through the drilling well; identifying a location within the drilling well at which the magnitude of the local magnetic anomaly is greatest; and positioning the PMR tool at the position within the drilling well at which the magnitude of the local magnetic anomaly is greatest.

The controller may be further operatively connected to a telemetry system, and the method may further comprise: transmitting the calculated ranging information to the surface with the telemetry system. The controller may include a processor that is adapted to receive the measurements of the magnetometers and calculate the ranging information.

In some embodiments, a passive magnetic ranging (PMR) tool comprises a ranging collar; a longitudinal array of magnetometers extending along the length of the ranging collar; and a controller. The controller may be operatively connected to the plurality of magnetometers and may be adapted to receive measurements of a local magnetic field from the magnetometers and calculate ranging information. The ranging information may include a distance and a direction from the ranging collar to a target well. The PMR tool may further comprise a radial array of magnetometers positioned radially about the ranging collar. The controller may further comprise a processor adapted to calculate the ranging information. The processor may be operatively connected to a telemetry system, and may be adapted to transmit the calculated ranging information to the surface using the telemetry system. The controller may be further operatively connected to a measurement-while-drilling (MWD) tool.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
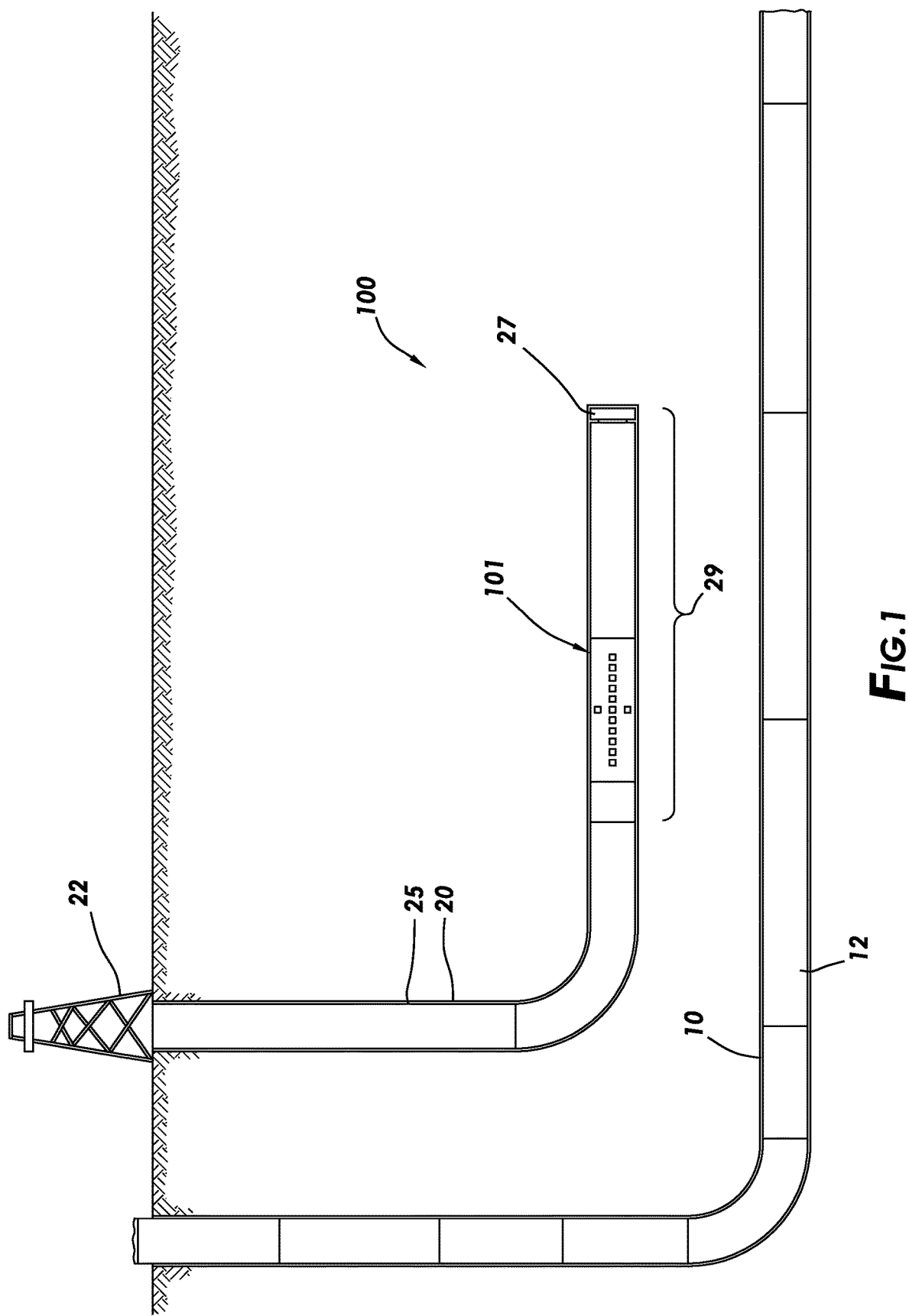
FIG. 1 depicts an overview of a passive magnetic ranging (PMR) system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an overview of a PMR system 100 consistent with at least one embodiment of the present disclosure. In some such embodiments, target well 10 may be a previously-existing well formed in the subsurface. Target well 10 may be cased with casing 12. Casing 12 may be formed from a ferromagnetic material such as steel. In some embodiments, a drilling well 20 may be drilled from the surface by, for example, drilling rig 22. Drilling well 20 may be, for example and without limitation, a relief well, a SAGD well, or a frac recovery well. In some embodiments, drilling well 20 may be formed independently of target well 10 and the operations described herein may be used for collision-avoidance between drilling well 20 and target well 10. In other embodiments, drilling well 20 may be used during a plug and abandonment operation.

Drilling well 20 may be formed using a drill string 25 that includes a drill bit 27. In some embodiments, drill string 25 may be rotated by drilling rig 22 or drill bit 27 may be driven by downhole motor 31 included within drill string 25. Drill string 25 may include a passive magnetic ranging (PMR) tool 101. In some embodiments, PMR tool 101 may be included as part of a bottomhole assembly (BHA) 29 of drill string 25. Although described herein with respect to a drilling operation, PMR tool 101 may be used in any wellbore and may, in some embodiments, be positioned within drilling well 20 by means other than drill string 25, including, for example and without limitation, on a wireline or coiled tubing string.

Figure 2:
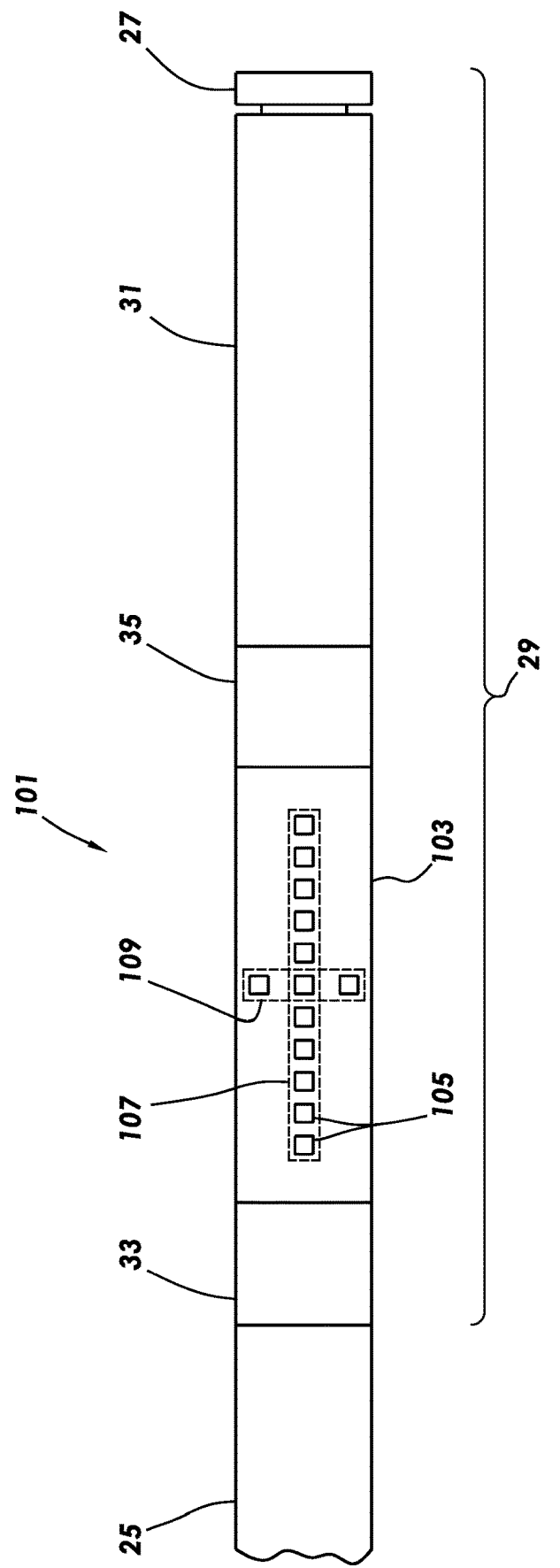
FIG. 2 depicts a side schematic view of a passive ranging tool consistent with at least one embodiment of the present disclosure.

In some embodiments, as depicted in FIG. 2, PMR tool 101 may be formed as a collar of drill string 25, referred to herein as ranging collar 103. Ranging collar 103 may be a tubular member joined into drill string 25 or may be coupled to another tool or component of drill string 25. In some embodiments, ranging collar 103 may be positioned near or as a part of BHA 29 of drill string 25. In some embodiments, BHA 29 may include the drill bit 27, a downhole motor 31, ranging collar 103, and a telemetry system 33. Telemetry system 33 may be used to transmit and receive information between BHA 29 including ranging collar 103 and the surface. Telemetry system 33 may be any telemetry system known in the art including, for example and without limitation, a mud pulse telemetry system, electromagnetic telemetry system, acoustic telemetry system, or combination thereof. In some embodiments, BHA 29 may further include a measurement while drilling (MWD) tool 35. MWD tool 35 may include one or more sensors including, for example and without limitation, gyros, accelerometers, and magnetometers, adapted to allow the measurement of the position of BHA 29 within the ground, including, for example and without limitation, the azimuth and inclination of BHA 29.

In some embodiments, ranging collar 103 may include a plurality of magnetometers 105. In some embodiments, magnetometers 105 may be positioned on ranging collar 103 such that each magnetometer detects the magnetic field at the respective location of that magnetometer. In some embodiments, one or more of magnetometers 105 may be a three-axis magnetometer.

In some embodiments, at least some of the plurality of magnetometers 105 may be included as part of a longitudinal magnetometer array 107. Longitudinal magnetometer array 107 may extend along the length of ranging collar 103. In some embodiments, the magnetometers 105 in longitudinal magnetometer array 107 may form a line. In some embodiments, the length of longitudinal magnetometer array 107 may be determined at least in part with respect to the anticipated distance between drilling well 20 and target well 10. For example and without limitation, in some embodiments, the length of longitudinal magnetometer array 107 may be at least 1.5 times the expected separation between drilling well 20 and target well 10.

In some embodiments, magnetometers 105 of longitudinal magnetometer array 107 may be positioned such that each magnetometer is at a known spacing from adjacent magnetometers 105. In some embodiments, magnetometers 105 of longitudinal magnetometer array 107 may be positioned equally spaced along ranging collar 103. In some embodiments, the distribution of magnetometers 105 of longitudinal magnetometer array 107 may vary along ranging collar 103. For example and without limitation, in some embodiments, magnetometers 105 of longitudinal magnetometer array 107 may be positioned such that the space between adjacent magnetometers 105 of longitudinal magnetometer array 107 is smaller toward the middle of ranging collar 103 than toward the ends of ranging collar 103. In some embodiments, the arrangement of magnetometers 105 of longitudinal magnetometer array 107 may be optimized based on one or more anticipated characteristics of target well 10, drilling well 20, or casing 12. Although depicted as including 11 magnetometers 105, longitudinal magnetometer array 107 may include more or fewer magnetometers 105 without deviating from the scope of this disclosure.

Figure 3:
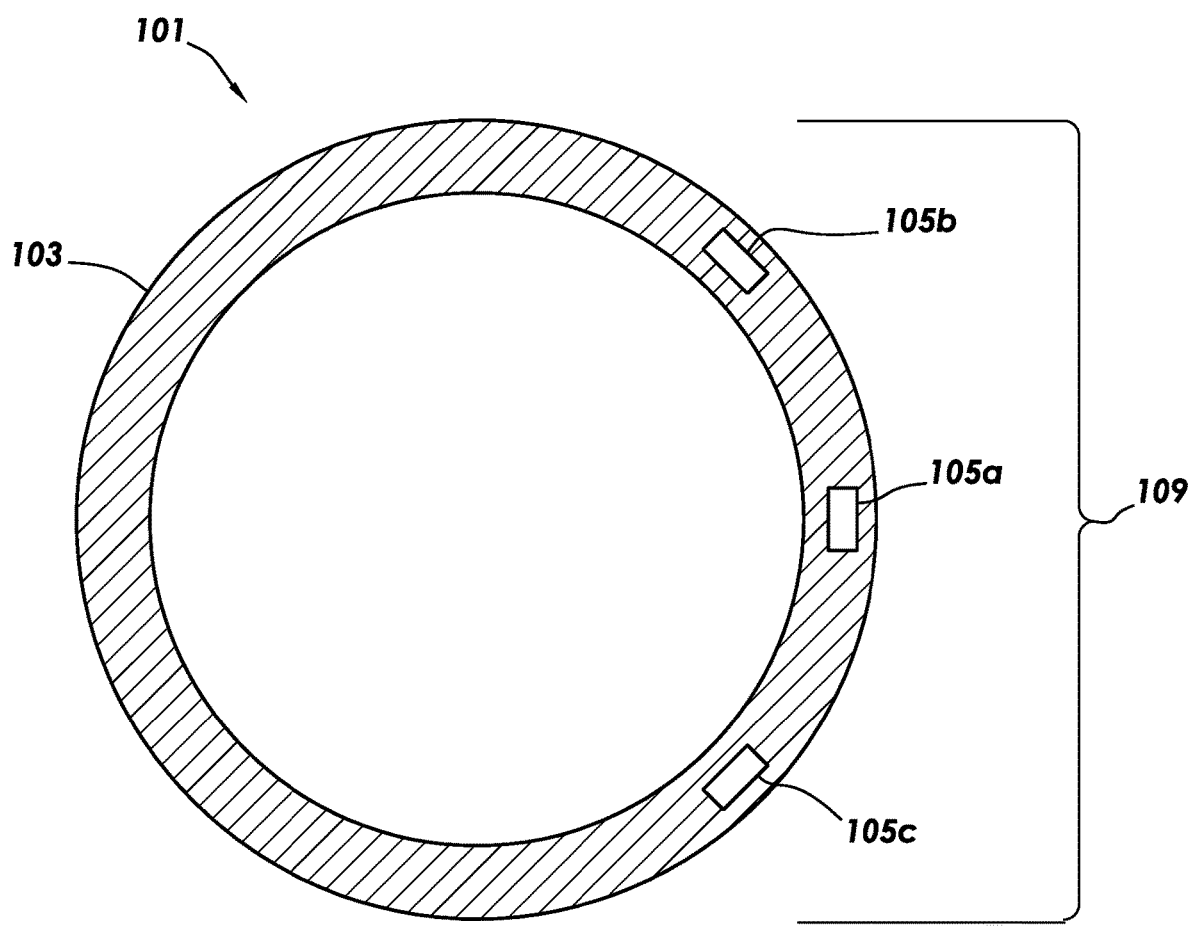
FIG. 3 depicts a cross section view of a passive ranging tool consistent with at least one embodiment of the present disclosure.

In addition or alternatively, ranging collar 103 may include one or more magnetometers 105 that are radially displaced from each other around the circumference of ranging collar 103 so as to form a radial magnetometer array 109. For example, as depicted in FIG. 3, one or more magnetometers 105a-c may be arranged radially about ranging collar 103 at a desired location along ranging collar 103 to form radial magnetometer array 109. In some embodiments, radial magnetometer array 109 may include, for example, a magnetometer 105a that is included as part of longitudinal magnetometer array 107. Although depicted as including three radially displaced magnetometers 105a-c, radial magnetometer array 109 may include more or fewer magnetometers 105 without deviating from the scope of this disclosure. For example, in some embodiments, radial magnetometer array 109 may include two magnetometers 105 such that the two magnetometers 105 are positioned on opposite sides of ranging collar 103. In other embodiments, such as that depicted in FIG. 3, magnetometers 105*a-c* may be spaced radially about ranging collar 103 evenly or unevenly.

Figure 4:
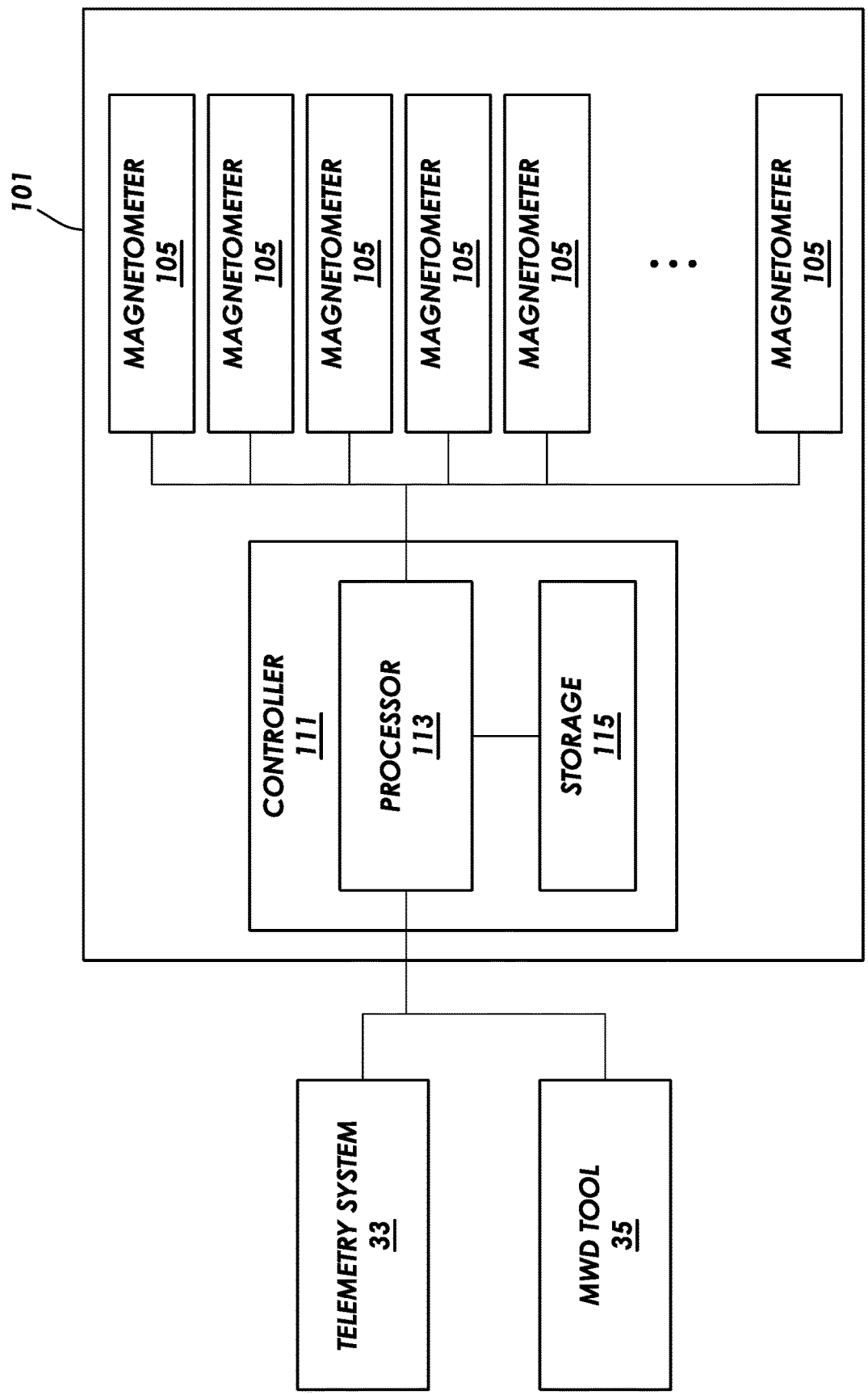
FIG. 4 depicts a schematic diagram of a passive ranging tool consistent with at least one embodiment of the present disclosure.

In some embodiments, as shown schematically in FIG. 4, PMR tool 101 may include a controller 111. Controller 111 may be operatively connected to magnetometers 105, telemetry system 33, and MWD tool 35, as well as other downhole tools included within drill string 25. In some embodiments, controller 111 may include a processor 113. Processor 113 may include, for example and without limitation, one or more central processing units, microprocessors, microcontrollers, a microprocessor, digital signal processors, ASICs, or digital logic circuits as in an FPGA or CPLD. Processor 113 may be operatively connected to magnetometers 105 and may be positioned to control and receive measurements from magnetometers 105. In some embodiments, controller 111 may include one or more storage media 115 positioned to store data measured by magnetometers 105, data from processor 113, instructions or other messages received through telemetry system 33, or messages to be transmitted through telemetry system 33, or computer program instructions for operating processor 113. In some embodiments, processor 113 may be adapted to use measurements from magnetometers 105 to determine ranging information between PMR tool 101 and target well 10 as further discussed herein below.

Figure 5:
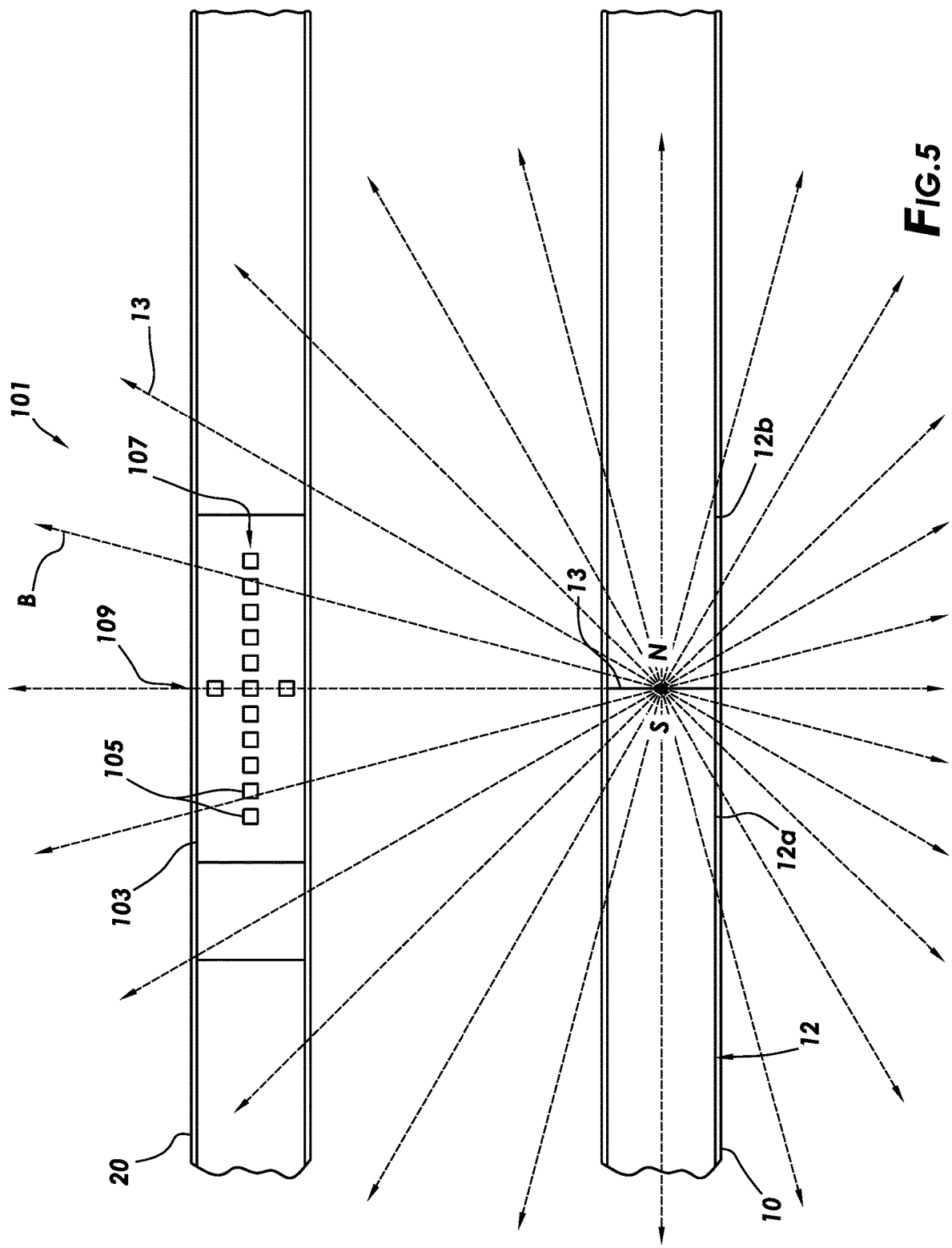
FIG. 5 depicts a schematic view of a passive ranging operation consistent with at least one embodiment of the present disclosure.

In some embodiments, because casing 12 positioned within target well 10 is ferromagnetic, casing 12 may cause an anomaly in the local magnetic field B about target well 10 depicted in FIG. 5 by magnetic field lines of local magnetic anomaly B without the application of any magnetic source. In some instances, the magnetic anomaly may approximate the magnetic field lines of a magnetic dipole or a magnetic monopole. In some instances, the intersection between adjacent casing segments 12*a*, 12*b* at a casing joint 13 may create a magnetic anomaly that may have magnetic field lines approximately as depicted in FIG. 5. In some embodiments, casing 12 may create a magnetic anomaly that may approximate a series of magnetic monopoles at each such casing joint 13. In some embodiments, casing joint 13 may be magnetized.

In operation, PMR tool 101 may be positioned within drilling well 20. Drilling well 20 may have a desired proximity to target well 10, as depicted in FIG. 5. In some embodiments, where PMR tool 101 is included as part of drill string 25, PMR tool 101 may be positioned at the desired location during a drilling operation. In some such embodiments, during the drilling operation, one or more magnetometers 105 may be sampled to detect the local magnetic anomaly B of target well 10 as drill string 25 progresses through the earth. In some embodiments, the location within drilling well 20 at which the magnitude of the local magnetic anomaly B is greatest may indicate a position within drilling well 20 at which PMR tool 101 is most closely aligned with casing joint 13. In some embodiments, drilling may continue until one or more lengths of drill pipe have been drilled down. Drill string 25 may then be repositioned within drilling well 20 such that PMR tool 101 is positioned at an optimal position relative to casing joint 13, such as at the position at which the measured value of the local magnetic anomaly B was greatest during the drilling operation. In some embodiments, drill string 25 may be held in this position for the duration of a PMR operation. In some embodiments, other systems used during the drilling operation, including, for example and without limitation, tools within BHA of drill string 25 or mud pumps used during the drilling operation may be turned off during a PMR operation.

In some embodiments, the inclination, azimuth, and toolface orientation of PMR tool 101 may be determined as part of the operation. In some embodiments, inclination and azimuth may be received from sensors within MWD tool 35 or other sensors in or on PMR tool 101. For example, in some instances, it may be difficult to measure the azimuth of PMR tool 101 magnetically because of the perturbations caused by target well 10. In such instances, it may be desirable to use a gyroscopic to measure the azimuth of PMR tool 101. Similarly, accelerometers near, in, or on PMR tool 101 could be used to indicate inclination and toolface orientation.

In some embodiments, once PMR tool 101 is at a desired position within drilling well 20, a plurality of magnetometers 105 may be used to measure the local magnetic anomaly B at each magnetometer 105 along PMR tool 101. In some embodiments, processor 113 may use the determined azimuth to subtract the known Earth magnetic field from the values measured on each magnetometer 105, thereby isolating the magnetic anomaly caused by casing 12 of target well 10 so as to generate an adjusted magnetometer reading. The adjusted magnetometer readings may be used by processor 113 to determine the range and direction between PMR tool 101 and target well 10 or an aspect of target well 10 such as casing joint 13.

Figure 6:
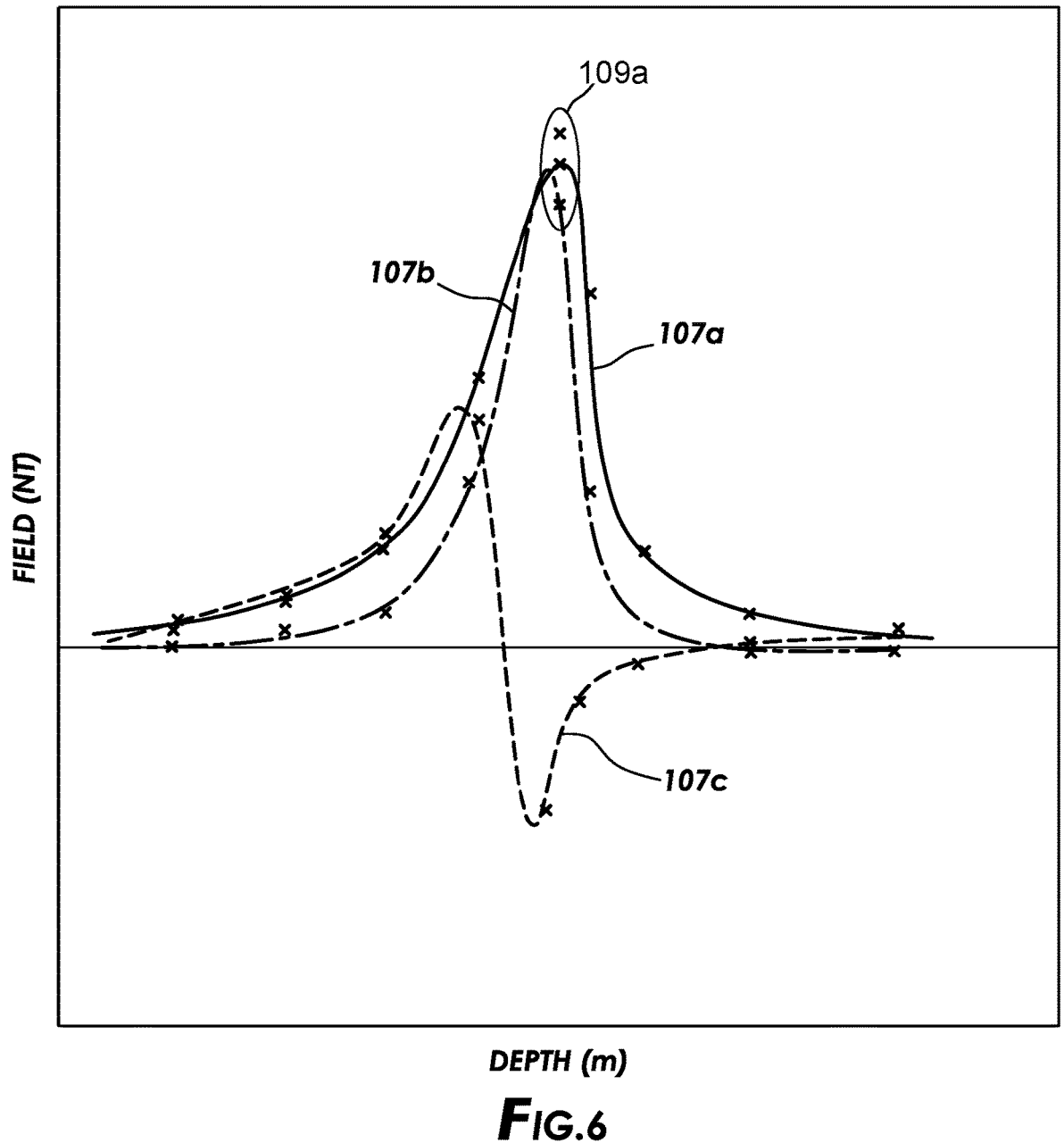
FIG. 6 depicts a plot of example magnetic data obtained by the passive ranging tool depicted in FIG. 5.

In some embodiments, for example and without limitation, the measurements used by processor 113 may include the total magnitude of the magnetic field detected by the respective magnetometer 105 (BmonoTotal), the magnitude of the magnetic field extending radially relative to ranging collar 103 (BmonoRadial(xy)), and the magnitude of the magnetic field extending axially relative to ranging collar 103 (BmonoAxial(z)). As the arrangement of magnetometers 105 relative to the position within drilling well 20—i.e. the depth of each of magnetometers 105 from the surface within drilling well 20—is known, the local magnetic anomaly B may be plotted as magnitude vs. depth as depicted in FIG. 6.

Magnetometers 105 of radial magnetometer array 109 may be positioned at a single depth of drilling well 20 but may measure different values for BmonoTotal, as the distance between target well 10 and each such magnetometer 105 in radial magnetometer array 109 may be slightly different. The BmonoTotal measured at each magnetometer 105 of radial magnetometer array 109, depicted in FIG. 6 at 109*a*, may be fit to a selected model in order to determine the radial direction of target well 10 relative to PMR tool 101, so as to indicate the azimuthal direction of target well 10 relative to drilling well 20.

Using the measured magnetic field data from the array and the measured inclination, azimuth, and toolface of the PMR tool, and the measured azimuth, the distance between PMR tool 101 and target well 10, and thereby the distance between drilling well 20 and target well 10, may be determined. In some embodiments, the radial direction of target well 10 relative to drilling well 20 may also be determined. Specifically, for each magnetometer location, the earth's magnetic field at that location can be subtracted from the magnetic field measurements made at that location.

The resulting magnetic field data for each magnetometer 105 of longitudinal magnetometer array 107, depicted as plots BmonoTotal 107a, BmonoRadial(xy) 107b, and BmonoAxial(z) 107c, may then be fit to a selected model in order to characterize the gradient of the local magnetic anomaly B created by casing 12 of target well 10.

In some embodiments, the model fitting operations may be undertaken by a processor at the surface. In other embodiments, the model fitting operations may be undertaken by processor 113 of controller 111 of PMR tool 101. In some such embodiments, processor 113 may calculate the ranging information between target well 10 without the need to transmit any magnetometer readings to the surface using telemetry system 33. In some embodiments, once calculated, processor 113 may transmit the ranging information including the distance and direction from drilling well 20 and target well 10 to a receiver at the surface using telemetry system 33. In some embodiments, additional information regarding the model fit may also be transmitted to the surface including, for example and without limitation, residuals associated with the fit, confidence in the fit, or some or all raw data collected. In some embodiments, processor 113 may transmit a distance in meters from the middle of longitudinal magnetometer array 107 to where the model fitting operation found the peak magnitude of local magnetic anomaly B allowing, for example and without limitation, determination of ranging information at a particular depth within drilling well 20.

Once the calculation of ranging information is complete, operations in target well 10 may continue. The ranging operation may be repeated at any location within drilling well 20 as desired. In some embodiments, ranging information may be fed to MWD tool 35 and may be used to guide further drilling operations of drill string 25.

In some embodiments, the model and parameters of the model used by processor 113 to calculate the ranging information may be programmed into controller 111. In some embodiments, the model to be used may be specified by an instruction to PMR tool 101 sent from the surface via telemetry system 33. In some embodiments, parameters of the model may be specified or updated by an instruction to PMR tool 101 sent from the surface via telemetry system 33.

In some embodiments, one or more constraints to the model fit may be programmed into controller 111 including, for example and without limitation, estimated pole strength, known hemispherical direction to target, etc. In some embodiments, or one or more such constraints may be specified or updated by an instruction to PMR tool 101 sent from the surface via telemetry system 33.

In some embodiments, operating modes of PMR tool 101 may be specified by instructions sent from the surface via telemetry system 33. For example, in some embodiments where two samples of magnetometers 105 are to be used, an instruction from the surface may instruct PMR tool 101 to undertake such measurements and may indicate one or more variables to PMR tool 101 such as, for example, the distance drill string 25 is moved between such measurements.

In some embodiments, measurements from magnetometers 105 may be taken simultaneously. In some embodiments, measurements from magnetometers 105 may be taken sequentially to, for example and without being bound to theory, reduce error induced onto magnetometer readings caused by current from wires supplying power to or receiving data from other magnetometers 105.

Figure 7:
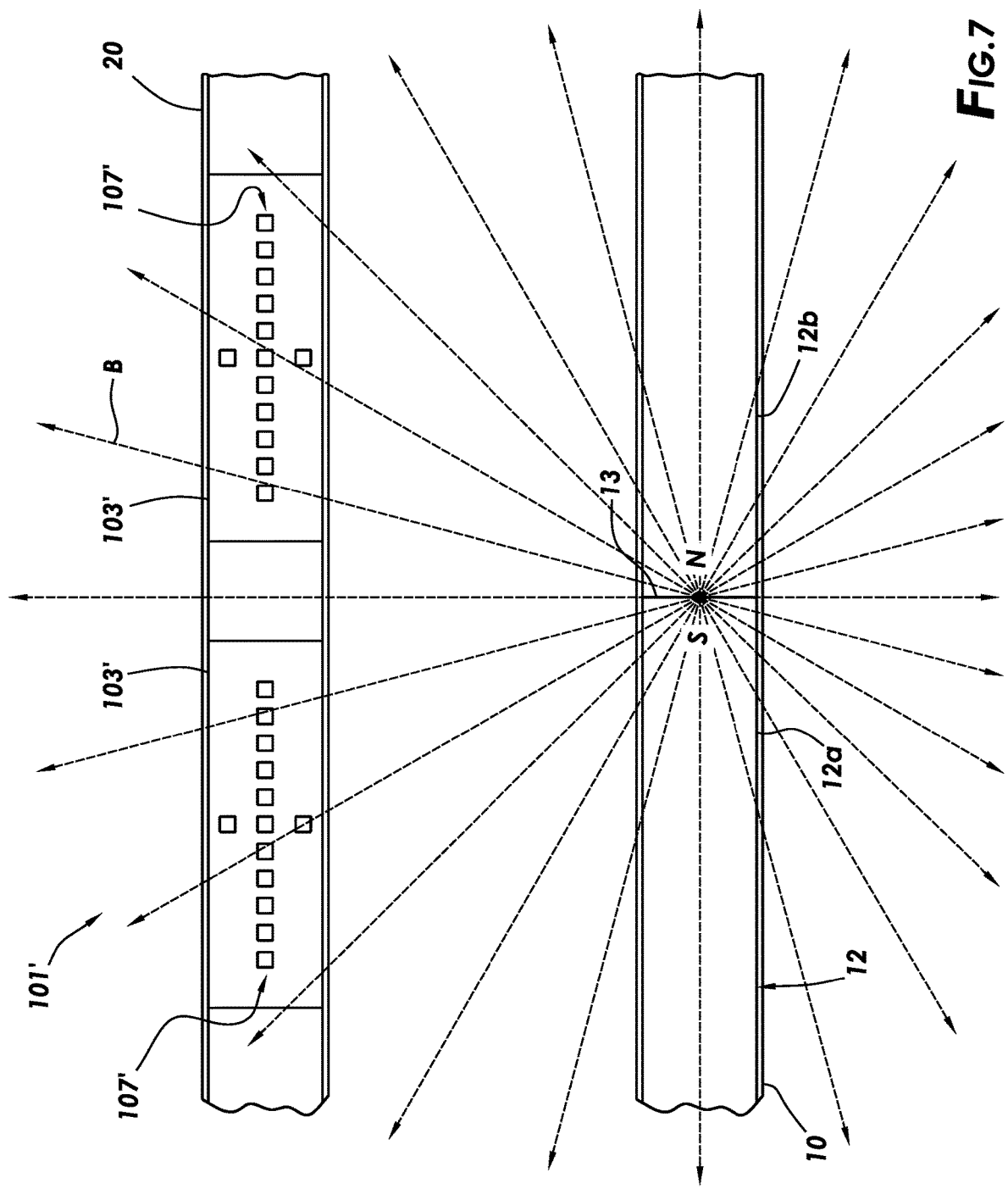
FIG. 7 depicts a side schematic view of a passive ranging operation consistent with at least one embodiment of the present disclosure.

In some embodiments, as depicted in FIG. 7, multiple longitudinal magnetometer arrays 107' may be utilized to, for example and without limitation, increase the effective range of PMR tool 101'. In some such embodiments, two or more ranging collars 103' may be joined end-to-end and used as described herein above. In some embodiments, a single ranging collar 103 may be used and may be repositioned after the initial magnetometer measurements are made.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the scope of the present disclosure and that they may make various changes, substitutions, and alterations herein without departing from the spirit and scope of the present disclosure. Likewise, unless expressly stated, the sequential recitation of steps in the claims that follow is not intended as a requirement that the steps be performed in the sequence recited.

What is claimed is:

1. A method comprising:
a) positioning a passive magnetic ranging (PMR) tool in a drilling well, wherein the drilling well has a desired proximity to a target well, the target well including a ferromagnetic casing, the PMR tool including:
a ranging collar;
a longitudinal array of magnetometers extending along the length of the ranging collar; and
a controller, the controller operatively connected to the plurality of magnetometers;
b) measuring with each of the magnetometers a local magnetic anomaly created by the ferromagnetic casing of the target well so as to generate a plurality of magnetometer readings corresponding to the positions of the magnetometers;
c) receiving the plurality of magnetometer readings with the controller; and
d) using the received measurements to calculate ranging information, the ranging information including the range and direction from the PMR tool to the target well.

2. The method of claim 1 wherein the PMR tool further comprises a radial array of magnetometers positioned radially about the ranging collar, and wherein the ranging information is calculated at least in part based on measurements of the magnetometers of the radial array of magnetometers.

3. The method of claim 2 wherein the controller is further operatively connected to a measurement-while-drilling (MWD) tool, and wherein the method further comprises:
determining an azimuth, inclination and toolface orientation of the PMR tool with the MWD tool.

4. The method of claim 3, further comprising:
before step d), for each magnetometer position, subtracting the Earth magnetic field at that magnetometer position from the magnetometer reading at that position.

5. The method of claim 4 wherein the Earth magnetic field at each magnetometer position is based on the azimuth, inclination and toolface orientation of the PMR tool.

6. The method of claim 1 wherein step d) includes fitting the received measurements to a model selected to represent the local magnetic anomaly created by the casing.

7. The method of claim 6 wherein the model is selected from a magnetic monopole, smeared monopole, series of magnetic monopoles, or magnetic dipole.

8. The method of claim 1 wherein the PMR tool includes a telemetry system operatively coupled to the controller, further including the steps of:
transmitting an instruction from the surface, the instruction specifying at least one of the model to be selected by a processor, a parameter of the selected model, or a constraint of the model fit to be used by the processor when calculating the ranging information;
receiving the instruction by the telemetry system; and
calculating the ranging information according to the received instruction.

9. The method of claim 1 wherein step a) comprises:
moving the PMR tool through the drilling well;
sampling a magnitude of the local magnetic anomaly with a magnetometer as the PMR tool moves through the drilling well;
identifying a location within the drilling well at which the magnitude of the local magnetic anomaly is greatest; and
positioning the PMR tool at the position within the drilling well at which the magnitude of the local magnetic anomaly is greatest.

10. The method of claim 1 wherein the controller is further operatively connected to a telemetry system, and the method further comprises:
transmitting the calculated ranging information to the surface with the telemetry system.

11. The method of claim 1 wherein the controller includes a processor, the processor adapted to receive the measurements of the magnetometers and calculate the ranging information.

12. A method comprising:
a) positioning a passive magnetic ranging (PMR) tool in a drilling well, wherein the drilling well has a desired proximity to a target well, the target well including a ferromagnetic casing, and wherein the PMR tool includes:
a ranging collar;
a longitudinal array of magnetometers extending along the length of the ranging collar;
a radial array of magnetometers positioned radially about the ranging collar; and
a controller, the controller operatively connected to the plurality of magnetometers and also operatively connected to a measurement-while-drilling (MWD) tool;
b) measuring with each of the magnetometers a local magnetic anomaly created by the ferromagnetic casing of the target well so as to generate a plurality of magnetometer readings corresponding to the positions of the magnetometers;
c) receiving the plurality of magnetometer readings with the controller;
d) for each magnetometer position, subtracting the Earth magnetic field at that magnetometer position from the magnetometer reading at that position to generate an adjusted magnetometer reading;
e) determining an azimuth, inclination, and toolface orientation of the PMR tool with the MWD tool;
f) using the adjusted magnetometer readings and the azimuth, inclination, and toolface orientation of the PMR tool to calculate ranging information, wherein the ranging information includes the range and direction from the PMR tool to the target well.

13. The method of claim 12 wherein step f) includes fitting the received measurements to a model selected to represent the local magnetic anomaly created by the casing.

14. The method of claim 13 wherein the model is selected from a magnetic monopole, series of magnetic monopoles, or magnetic dipole.

15. The method of claim 13 wherein the PMR tool includes a telemetry system operatively coupled to the controller, further including the steps of:
transmitting an instruction from the surface, the instruction specifying at least one of the model to be selected by the processor, a parameter of the selected model, or a constraint of the model fit to be used by the processor when calculating the ranging information;
receiving the instruction by the telemetry system; and
calculating the ranging information according to the received instruction.

16. The method of claim 15 wherein step a) comprises:
moving the PMR tool through the drilling well;
sampling the magnitude of the local magnetic anomaly with a magnetometer as the PMR tool moves through the drilling well;
identifying a location within the drilling well at which the magnitude of the local magnetic anomaly is greatest; and
positioning the PMR tool at the position within the drilling well at which the magnitude of the local magnetic anomaly is greatest.

17. A passive magnetic ranging (PMR) tool comprising:
a ranging collar;
a longitudinal array of magnetometers extending along the length of the ranging collar; and
a controller, the controller operatively connected to the plurality of magnetometers, the controller adapted to receive measurements of a local magnetic field from the magnetometers and calculate ranging information, the ranging information including a distance and a direction from the ranging collar to a target well.

18. The PMR tool of claim 17, further comprising a radial array of magnetometers positioned radially about the ranging collar.

19. The PMR tool of claim 17 wherein the controller further comprises a processor adapted to calculate the ranging information, wherein the processor is operatively connected to a telemetry system, and wherein the processor is adapted to transmit the calculated ranging information to the surface using the telemetry system.

20. The PMR tool of claim 17, wherein the controller is further operatively connected to a measurement-while-drilling (MWD) tool.

* * * * *